(12) United States Patent
Burke et al.

(10) Patent No.: US 8,396,632 B2
(45) Date of Patent: Mar. 12, 2013

(54) MULTIPLE HARVESTER UNLOADING SYSTEM

(75) Inventors: Daniel J. Burke, Cordova, IL (US); Alan D. Sheidler, Moline, IL (US); Mark DePoorter, Coal Valley, IL (US); Jim Adamson, Colona, IL (US); Santosh Chaturvedi, Lucknow (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/458,681

(22) Filed: Apr. 27, 2012

(65) Prior Publication Data

US 2012/0213619 A1 Aug. 23, 2012

Related U.S. Application Data

(62) Division of application No. 12/233,182, filed on Sep. 18, 2008, now Pat. No. 8,180,534.

(51) Int. Cl.
    *G06F 7/70* (2006.01)
(52) U.S. Cl. .......................................................... 701/50
(58) Field of Classification Search .................. 701/50, 701/408; 414/343, 800; 198/312; 56/473.5, 56/10.2 R, 10.2 A, 16.6; 160/114
See application file for complete search history.

(56) References Cited

U.S. PATENT DOCUMENTS

| | | | | |
|---|---|---|---|---|
| 1,444,775 A * | 2/1923 | Bennett | ...................... | 198/502.4 |
| 2,511,672 A * | 6/1950 | Kemmer | ...................... | 198/311 |
| 3,133,727 A * | 5/1964 | Luscombe | .................... | 366/186 |
| 3,598,224 A * | 8/1971 | Oury | ............................. | 198/301 |
| 3,945,484 A * | 3/1976 | Oury | ............................. | 198/313 |
| 4,944,630 A * | 7/1990 | Brock et al. | ................... | 404/83 |
| 5,090,549 A * | 2/1992 | Thiel | .............................. | 198/312 |
| 5,911,300 A * | 6/1999 | Mraz | .............................. | 198/303 |
| 6,148,255 A | 11/2000 | Van Der Lely | | |
| 6,216,071 B1 * | 4/2001 | Motz | ............................... | 701/50 |
| 6,283,269 B1 * | 9/2001 | Mayer | ............................ | 198/313 |
| 6,378,686 B1 * | 4/2002 | Mayer et al. | .................. | 198/314 |
| 6,682,416 B2 * | 1/2004 | Behnke et al. | ................. | 460/114 |
| 6,688,450 B2 * | 2/2004 | Speers et al. | ................... | 198/312 |
| 6,732,024 B2 | 5/2004 | Wilhelm Rekow et al. | | |
| 6,932,554 B2 * | 8/2005 | Isfort et al. | ..................... | 414/397 |
| 7,537,519 B2 * | 5/2009 | Huster et al. | ................... | 460/114 |
| 2002/0165649 A1 | 11/2002 | Wilhelm Rekow et al. | | |
| 2006/0014489 A1 * | 1/2006 | Fitzner et al. | ................ | 455/3.02 |
| 2006/0045701 A1 | 3/2006 | Dillon | | |
| 2010/0012467 A1 * | 1/2010 | Coers et al. | .................... | 198/617 |
| 2010/0274452 A1 * | 10/2010 | Ringwald et al. | ............... | 701/50 |
| 2010/0332051 A1 * | 12/2010 | Kormann | .......................... | 701/2 |

FOREIGN PATENT DOCUMENTS

| | | |
|---|---|---|
| CA | 2 305 606 A1 | 10/2000 |
| DE | 100 64 860 A1 | 6/2002 |
| DE | 100 64 862 A1 | 7/2002 |
| DE | 10 2007 009 666 A1 | 8/2008 |
| WO | 9918482 A1 | 4/1999 |
| WO | 0035265 A1 | 6/2000 |

OTHER PUBLICATIONS

European Search Report dated Dec. 21, 2009 (7 pages).

* cited by examiner

*Primary Examiner* — Samir Abdosh
(74) *Attorney, Agent, or Firm* — Taylor IP, P.C.

(57) ABSTRACT

A grain moving system providing for single point unloading of harvesters to a grain cart. There are a plurality of harvesting machines including a first harvesting machine and a second harvesting machine. The first harvesting machine being configured to deliver grain to the grain cart. The first harvesting machine receiving grain from the second harvesting machine. The first harvesting machine being configured for the coordination of grain transfer.

8 Claims, 4 Drawing Sheets

MULTIPLE HARVESTER UNLOADING SYSTEM

CROSS REFERENCE TO RELATED APPLICATIONS

This is a division of U.S. patent application Ser. No. 12/233,182, entitled "MULTIPLE HARVESTER UNLOADING SYSTEM", filed Sep. 18, 2008, now U.S. Pat. No. 8,180,534 which is incorporated herein by reference.

FIELD OF THE INVENTION

The present invention relates to agricultural harvesters, and, more particularly, to a master-slave multiple harvester unloading system.

BACKGROUND OF THE INVENTION

An agricultural harvester, such as a combine, is a large machine used to harvest a variety of crops from a field. A combine includes a header at the front of the combine to cut the ripened crop from the field. A feeder housing supporting the header transfers the crop material into the combine for threshing. The threshing and separating assemblies within the combine remove grain from the crop material and transfer the clean grain to a grain tank for temporary holding. Crop material other than grain exits from the rear of the combine and is distributed upon the field. An unloading auger or conveyor transfers the clean grain from the grain tank to a truck or grain cart for transport.

U.S. Pat. No. 6,216,071 discloses an apparatus and method for coordinating and monitoring the harvesting and transporting operations of an agricultural crop by multiple agricultural machines in a field. A grain cart is scheduled to be available for the unloading of harvesting machines when the harvested crop reaches a predetermined level in a particular harvesting machine. In US Patent Application Publication No. US 2006/0014489, there is disclosed a drive support system that coordinates the harvesting machines in a field and generates driving routes that are coordinated with each other so that the agricultural machines avoid collisions therebetween particularly during unloading procedures when the grain is transferred to a trailer. Canadian Patent CA 2 305 606 discloses an arrangement in which a vehicle is controlled from the first vehicle to maintain a set working position alongside the first vehicle utilizing GPS or ultrasonic distance measuring equipment. The second vehicle can be a loading truck for receiving discharge from a crop harvesting machine. German Patent Document DE10064862 discloses a system of coordinating agricultural vehicles working in the same field and between which crop is transferred including a navigation system fitted on one of the vehicles having a system for transmitting data between the vehicles.

What is needed in the art is a method and apparatus for coordinating the transfer of grain from multiple harvesters in a simultaneous manner.

SUMMARY OF THE INVENTION

The invention in one form is directed to a grain moving system providing for single point unloading of harvesters to a grain cart. There are a plurality of harvesting machines including a first harvesting machine and a second harvesting machine. The first harvesting machine being configured to deliver grain to the grain cart. The first harvesting machine receiving grain from the second harvesting machine. The first harvesting machine being configured for the coordination of grain transfer.

The invention in another form is directed to a method of unloading grain including the step of moving grain to a first harvesting machine to a second harvesting machine while both said first harvesting machine and second harvesting machine are traversing over the ground.

DETAILED DESCRIPTION OF THE INVENTION

Figure 1:
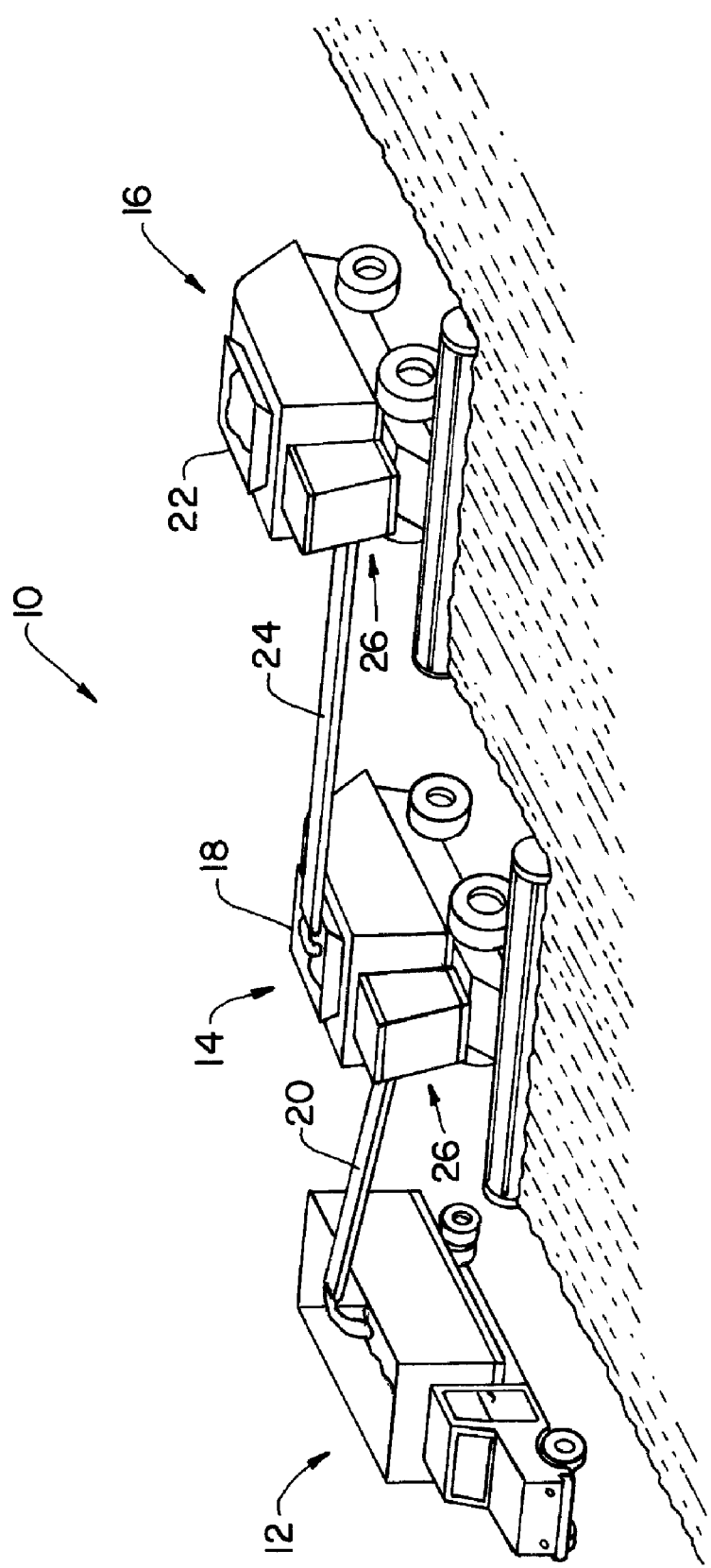
FIG. 1 is a perspective view of an embodiment of a grain transfer system of the present invention including a grain receiving vehicle and two combines.

Referring now to the drawings, and more particularly to FIG. 1, there is shown a grain moving or conveying system 10, also referred to as a grain transfer system 10, being carried out utilizing a grain transport vehicle 12, a grain harvester 14, and a grain harvester 16. Grain transport vehicle 12 may be any conveying type vehicle including a grain cart 12 or as illustrated in FIG. 1 as a grain truck 12. The use of the phrase "grain cart" herein is intended to encompass any grain moving vehicle for the transport of grain from a field to storage or unloading facility. Harvester 14 includes a grain tank 18 and a grain conveyance device 20. In a similar manner, grain harvester 16 includes a grain tank 22 and a grain conveyance device 24. Each of grain harvesters 14 and 16 include operator controls 26 in a cab of the harvesters. As shown in FIG. 1, grain is being moved from harvester 16, by way of grain conveyance device 24, and is dumping grain into grain tank 18 of harvester 14 while grain conveyance device 20 is moving grain from harvester 14 to grain cart 12.

Transferring grain from harvester-to-harvester poses unique problems that are addressed by the present invention. While it is commonly undertaken to unload grain from harvesters into a moving vehicle such as a truck, in which the operators of the two vehicles usually coordinate the speeds as the combine continues to harvest grain and transfers its load to the hauling vehicle. This can be done manually or automatically and is usually undertaken because the grain hauling vehicle typically has a large area into which grain can be placed thereby being forgiving of small steering errors between the two vehicles. Further, the transfer of the grain takes place at a high speed without regard the flow of grain into the grain tank of the harvester. When single point unloading takes place, as proposed by the present invention, not only is accurate coordination of the conveyance mechanism with the position of the open area of the grain tank necessary, but coordination of the flow of the grain into the grain tank has to take place so that a harvester in the chain of transfer is not overwhelmed by the flow. The use of the phrase "coordination of grain transfer" in this specification and the claims is to be understood to mean the control of the positioning of the grain transfer apparatus as well as the control of the flow of grain to a first harvester from a second harvester dependent on either determined grain flows into/from the first harvester or a determined amount of grain in the grain tank of the first harvester.

Figure 2:
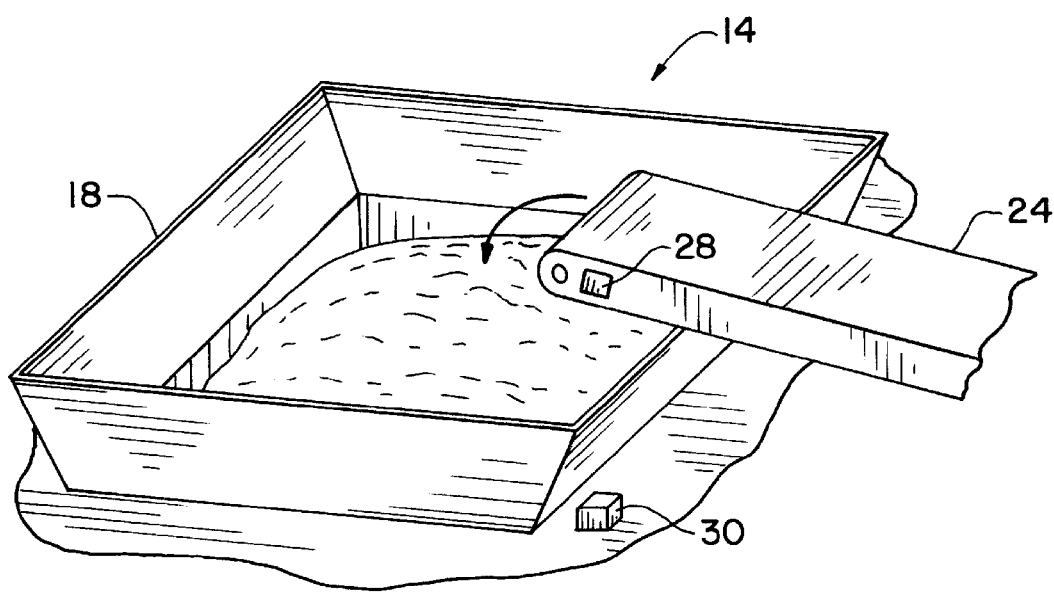
FIG. 2 is a perspective view of a portion of the grain conveying system of FIG. 1.

Now, additionally referring to FIG. 2, there is illustrated a grain tank 18 having a grain conveyance device 24 conveying grain into grain tank 18. Sensors 28 and 30 interact to provide positional information of a distal end of grain conveyance device 24 with the targeted open area of tank 18. Sensors 28 and 30 are utilized to help provide information to actuator systems on harvester 16 that alter the position of the distal end of grain conveying device 24 so that a collision does not occur between conveyance device 24 and grain tank 18 or any other part of harvesting machine 14. Information from sensors 28 and 30 is also used to adjust device 24 so that the flow of the grain from conveyance device 24, which is being propelled from the distal end of device 24, is targeted to hit the open area of tank 18 no mater what the attitude changes, elevation changes, velocity and steering variations between harvester 14 and 16 are during the transfer. As harvesting machines 14 and 16 are traversing the ground, grain from grain tank 22 is being transferred to grain tank 18. This coordination of grain transfer encompasses ensuring that the grain from grain conveyance device 24 continues to fall into tank 18 in spite of the yaw, roll, pitch, speed variations, and height variations between harvester 14 and 16 as they traverse the field.

Although the foregoing use of sensors 28 and 30 have been discussed, which may communicate with each other, it is also contemplated to only use one sensor to detect positional information of the grain tank from the conveyor, or the position of the conveyor from the grain tank. It is also contemplated that the relative positions of the grain tank and the conveyor may be determined by an algorithm using information from positional sensors on harvesters 14 and 16 and the known geometries of the elements of harvesters 14 and 16 to thereby compute the positions of the distal end of the conveyor and the open area target of the grain tank.

Figure 3:
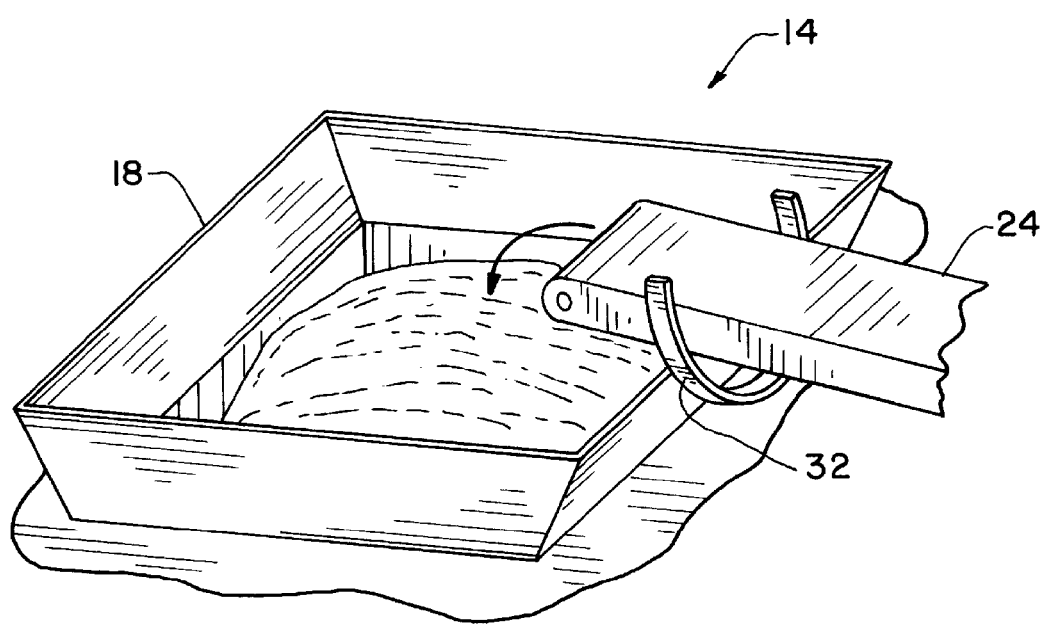
FIG. 3 is another perspective view of a portion of the grain conveyance system of FIG. 1.

Now, additionally referring to FIG. 3, there is shown a cradle 32 attached to grain tank 18 in which grain conveyance device 24 may be rested. As grain conveyance device 24 approaches grain tank 18 it is positioned proximate to cradle 32 as harvesters 14 and 16 moving along the field. Once grain conveyance device 24 has been determined to be properly positioned it is then lowered and rested in cradle 32. At this point some of the controlled support of device 24 is relinquished so that it can rest in cradle 32. Once device 24 is resting in cradle 32, some variation in the positioning of device 24 will occur as harvesting machines 14 and 16 move. However, this embodiment of the present invention allows for less active control of grain conveyance device 24, just the monitoring of the position of the end of device 24 relative to the open area of tank 18.

Figure 4:
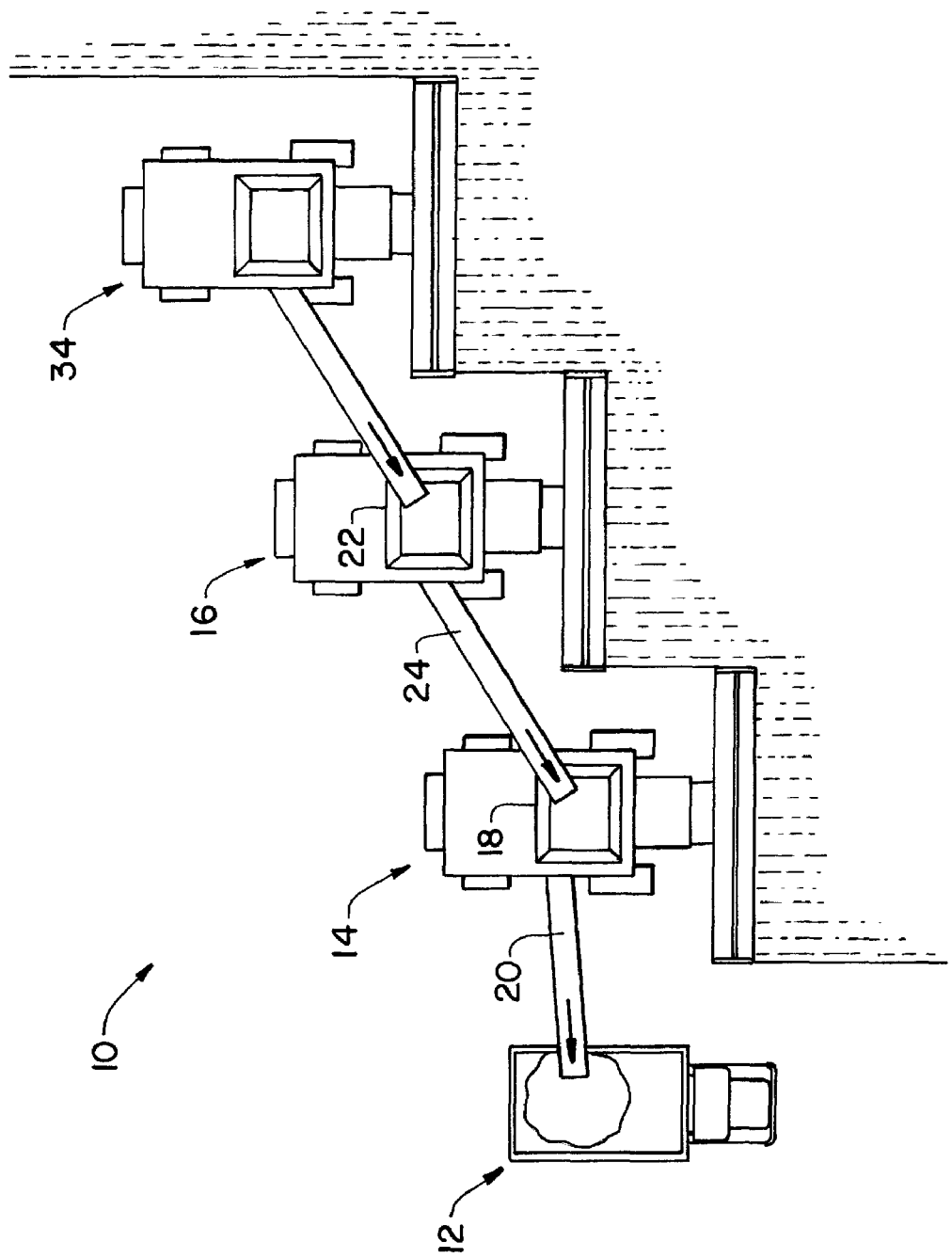
FIG. 4 is a top view of an implementation of the grain transfer system of the present invention.

Now, additionally referring to FIG. 4, there is shown a third harvesting machine 34 that is conveying grain into harvester 16 which is conveying grain into harvester 14, which is then conveying grain into grain cart 12. As illustrated in FIG. 4, the choreographing of multiple harvesting machines is contemplated by the present invention as harvesting machines each are harvesting grain and traversing the field. Coordination of grain moving system 10 is done by utilizing a master/slave relationship where one of the harvesting units becomes the master over the operation of the other harvesting units and the grain cart. For example, harvester 14 may be designated as the master which communicates its dominant relationship relative to harvesters 16 and 34 as well as to grain cart 12, each of which signal an acceptance of the relationship. This arrangement then requires each of the slave units to coordinate their traversal across the field in response to the direction of harvester 14. This encompasses not only the movement of each of the units but also the coordination of grain transfer between units. For example, if grain cart 12 has indicated that it is full, then master harvester 14 issues and instruction to harvester 16 to stop or slow the transfer of grain from unit 16. Unit 16 likewise evaluates the condition of tank 22 and sends an instruction to unit 34 based on the remaining capacity of tank 22 to continue, slow or stop the flow of grain. If grain tank 18 has sufficient capacity when grain cart 12 is released from its slave relationship to harvester 14 then the conveyance of grain may continue until a new grain cart (not illustrated) enters into a slave relationship with master unit 14, which then positions grain cart 12 for receipt of grain. Unit 14 then restarts the conveyance of grain by way of device 20.

In grain moving system 10, harvester 34 will empty its grain tank first. At that point, it will move its grain conveyance device away from grain tank 22 and terminate the slave relationship with master unit 14. It is also contemplated that unit 16 can be a master relative to unit 34, which can define unit 16 as a submaster/slave unit 16 that coordinates the movement of harvester 34 relative to unit 16 with unit 14 being the master over unit 16. This daisy-chaining of the master/slave relationship can be continued through multiple harvester units. Once harvester unit 34 is terminated from the choreographing of grain moving system 10 relative to itself, control of harvester 34 is returned to the operator as the crop is continued to be harvested.

In a similar manner when unit 16 is empty it signifies to unit 14 that tank 22 has been emptied and grain conveyance device 24 is disengaged from tank 18 by lifting grain conveyance device 24 from cradle 32 and retracting and swiveling device 24 to a stowed position. In a similar manner if grain conveyance device 24 is being actively managed as in FIG. 2 it is then moved away from tank 18, after stopping the conveyance of grain, and is moved to a stowed position.

Figure 5:
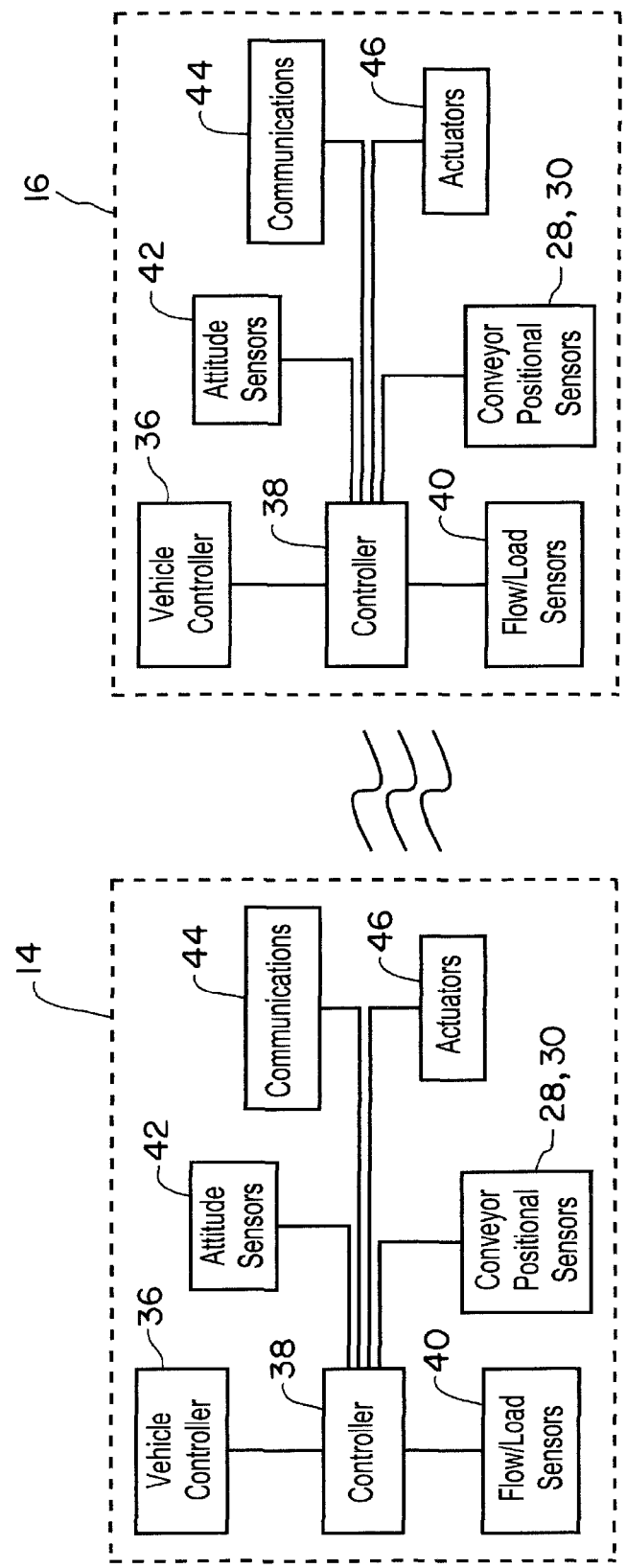
FIG. 5 is a schematicized illustration of elements of the grain transfer system of FIGS. 1-4.

Now, additionally referring to FIG. 5, there is shown in a schematical form the elements that are included in harvesters 14 and 16 and, by extension harvester 34 and other harvesting machines. Vehicle controller 36 controls the engine and other elements of the harvester and is interfaced with controller 38 that controls elements of the present invention. For ease of illustration, controller 38 is being described as a separate controller and the functions thereof may be incorporated into vehicle controller 36 as an algorithm or may be implemented in some other combination of hardware and software. Controller 38 interfaces with conveyor positional sensors 28 and 30, flow/load sensors 40, attitude/position sensors 42, communications device 44, and actuators 46. Vehicle controller 36 of harvester 14 indicates to controller 38 that it is to communicate by way of communication device 44 with harvester 16 and harvester 16 is in a slave relationship to harvester 14. The information from attitude sensors 42 of both harvesters 14 and 16 are communicated to the individual controllers 38 so that actuators 46 of unit 16 can be empowered to adjust the distal end of grain conveyance device 24 relative to grain tank 18. Attitude sensors 42, which may include GPS systems, provide three-dimensional positional information for each harvester. Information from positional sensor 28 of device 24 is communicated to harvester 14 to provide real-time closed loop control of actuators 46 in harvester 16 so that the grain can be moved to grain tank 18. Flow and load sensors 40 provide information to controller 38 regarding the inflow of grain to the respective tanks of harvesters 14 and 16 as well as the flow therefrom by way of grain conveyor/auger conveyance systems. Sensors 28, 30, 40, and 42 may be ultrasonic sensors, light sensors, proximity sensors, or the like. If sensors 28 and 30 individually, or based on a coacting interrelationship of the sensors, indicate that the distal end of conveyance device 24 is not properly positioned for the conveyance of grain, then controller 38 of harvester 16 stops the conveyance of grain by informing vehicle controller 36 to cease the conveyance. Once the proper positioning of the distal end of conveyance device 24 is reestablished then the flow of grain is likewise reestablished.

While the operation of the grain moving system is being undertaken, harvesting is continuing in harvesting machines 14, 16, and 34. This causes a difference in the flow of grain into the tanks associated with each harvester. The volume and yield of the crop being harvested alters the amount of grain being added to the grain tank as well as the speed of the conveyance of grain into and out of the respective grain tanks. These flows and/or the rate of change of grain in each grain tank is considered as the coordination of grain transfer is undertaken. The choreographing of the transfer then encompasses coordinating of the flow through each of the grain conveyance devices, measuring of the unused capacity in the respective grain tanks as well as the amount being harvested by a harvester unit. This choreography by grain moving system 10 alters the rates of flow of grain on each conveyance device to balance the transfer of grain so that it can be most efficiently transferred to grain cart 12.

For example, if harvesting machine 14 has been moving grain to cart 12 for some period of time and tank 18 is substantially empty then the speed at which conveying system 24 transfers grain from harvester 16 can be increased perhaps to a maximum speed for fast transfer from grain tank 22 to grain tank 18. If the contracondition is the situation then transfer of grain by way of device 24 can be slowed so that the transfer of grain by conveyance device 20 equals the harvested flow of grain coming into tank 18 plus the conveyance of grain being transferred by device 24.

The present invention advantageously allows for the single point unloading by way of the coordination of multiple harvesting machines that can be located in proximity to a single grain cart. The present invention allows a physical connection between two or more combines during the unloading process as the harvesting continues and it permits all of the combines to unload simultaneously into one grain cart. As previously mentioned, one combine can be the master in which the operator of that combine then remotely operates the other slave combines. The grain conveyance systems can extend out of either side of the combine and can be coordinated to unload in either direction, i.e., to the right or to the left. The grain cart can also be provided with a dual-sided, bi-directional unloading system to receive grain from the combines and to unload into a semi at the end of the field. Grain tank unloaders may interconnect with each other in a similar handshake concept to allow multiple grain tanks be filled in a single choreographed system by linking multiple harvesting machines as well as multiple grain carts. It is also contemplated that combines can have conveyors that extend to meet halfway between the harvesters, so that the conveyance of the grain is from one conveyor to another conveyor with the interfaced position being between the combines.

It is understood that conveyance devices 20 and 24 can be in the form of augers, belt conveyors, multi-level extensible conveyors, or other devices for the conveyance of grain. Once the harvesting machines are linked up, two or more harvesting machines then provide for the simultaneous single-point unloading of grain into a grain cart. Another contemplated manner of carrying out the present invention is that grain conveying device 24 can be positioned to immediately transfer its grain directly to grain conveyance device 20 rather than into tank 18. In this way, the grain drops off of the end of one conveyor onto the conveyor, of an adjacent harvester, underneath. This concept can be easily understood if what is described in FIGS. 2 and 3 as tank 18 is rather understood to be a funnel 18 that receives grain from conveyor 24 and funnels it to conveyor 20 that runs beneath funnel 18. In this way the grain from conveyor 24 does not go through the inner workings of harvester 14. Conveyor 20 will then be capable of passing grain received directly from conveyor 24 and from the grain tank of harvester 14 simultaneously.

The unloading of two or more combines simultaneously allows for a continuous flow of grain into the grain cart thereby quickly and efficiently utilizing the capacity of the grain cart. The combines are always driving in a formation while unloading and are proximate to each other while harvesting and are linked up during the unloading process. This advantageously allows the grain cart driver to simply interface with one combine and not waste time and energy chasing down multiple combines in the field.

Operator controls include a cancel button allowing the operator to take control of the harvester away from the master in the event of a problem. The controls also provide for the synchronization with the master unit so that the grain can be efficiently unloaded and yet still be under the control of an operator in the event of a pending problem. The difference in the size of capacity of grain tanks is also contemplated; particularly if one harvester is normally to be designated as the master it may have a larger grain tank to accommodate the transfer of grain from another harvesting unit.

Having described the preferred embodiment, it will become apparent that various modifications can be made without departing from the scope of the invention as defined in the accompanying claims.

The invention claimed is:

1. A grain moving system, comprising:
   a grain cart serving as an unloading point;
   a plurality of harvesting machines including a first harvesting machine and a second harvesting machine, said first harvesting machine configured to deliver grain to said grain cart, said first harvesting machine receiving grain from said second harvesting machine, said first harvesting machine being configured for the coordination of grain transfer to said grain cart;
   each harvesting machine including:
   a grain conveyance device having a distal end; and
   a grain tank having an open area;
   at least one of said first harvesting machine and said second harvesting machine include at least one sensor configured to detect proper positioning of said distal end of said grain conveyance device of said second harvesting machine relative to said grain tank of said first harvesting machine to prevent spillage of the grain; said at least one sensor sends information to said second harvesting machine when said distal end of said second harvesting machine is not properly positioned thereby causing said second harvesting machine to suspend operation of said grain conveyance device of said second harvesting machine.

2. A method of unloading grain, comprising the steps of:
   moving grain to a first harvesting machine from a second harvesting machine while both said first harvesting machine and said second harvesting machine are traversing over the ground, said first harvester being configured for the coordination of grain transfer; and
   moving grain from said first harvesting machine to a moving grain cart simultaneously with said moving grain to a first harvesting machine step.

3. The method of claim 2, further comprising the step of coordinating the output of grain from a grain conveying device of said second harvesting machine with an open area of a grain tank of said first harvesting machine.

4. The method of claim 3, wherein said coordinating step includes a step of communicating positional information of at least one of a location of a distal end of said grain conveying device and said grain tank between said first harvesting machine and said second harvesting machine.

5. The method of claim 4, wherein said coordinating step further includes the step of communicating a command from said first harvesting machine to said second harvesting machine to stop conveying grain from said second harvesting machine.

6. The method of claim 5, wherein said grain conveying device rests in a cradle connected to said first harvesting machine.

7. The method of claim 2, further comprising the step of choreographing the movement of said grain cart, said first harvesting machine and said second harvesting machine with each other while both of said moving steps are being executed.

8. The method of claim 7, wherein said choreographing step includes designating one of said grain cart, said first harvesting machine and said second harvesting machine as a master unit and the remaining units as slave units, said traversing over the ground of all of the units being under control of said master unit.

* * * * *